(12) United States Patent
Cho

(10) Patent No.: US 7,791,816 B2
(45) Date of Patent: Sep. 7, 2010

(54) ZOOM LENS AND IMAGE TAKING APPARATUS

(75) Inventor: Michio Cho, Kita-ku (JP)

(73) Assignee: FUJIFILM Corporation, Tokyo (JP)

( * ) Notice: Subject to any disclaimer, the term of this patent is extended or adjusted under 35 U.S.C. 154(b) by 31 days.

(21) Appl. No.: 12/366,320

(22) Filed: Feb. 5, 2009

(65) Prior Publication Data

US 2009/0207502 A1 Aug. 20, 2009

(30) Foreign Application Priority Data

Feb. 14, 2008 (JP) ............................. 2008-032902

(51) Int. Cl.
G02B 15/14 (2006.01)
G02B 23/14 (2006.01)
(52) U.S. Cl. .................. 359/683; 359/432; 359/676
(58) Field of Classification Search ............... 348/240.3; 359/432, 434, 676, 683, 686, 691
See application file for complete search history.

(56) References Cited

U.S. PATENT DOCUMENTS 5,363,163 A 11/1994 Hayashi et al.
7,224,535 B2 * 5/2007 Neil ............................ 359/683
7,502,557 B2 * 3/2009 Goto ........................... 396/150
7,509,046 B2 * 3/2009 Tochigi et al. ............... 396/386

FOREIGN PATENT DOCUMENTS

JP 05-005839 A 1/1993
JP 2000-131610 A 5/2000

* cited by examiner

Primary Examiner—David N Spector
(74) Attorney, Agent, or Firm—Sughrue Mion, PLLC

(57) ABSTRACT

A zoom lens having a variable image magnification, for introducing object light from an object side toward a light receiving surface on an optical axis, is provided. An objective lens system has a positive refractive power, and includes a prism for reflecting the object light being incident to guide the object light on the optical axis, and an aperture stop control device for passing the object light, the objective lens system forming an intermediate image by focusing the object light nearer to the object side than the light receiving surface. A relay lens system has a positive refractive power, includes plural lens groups movable on the optical axis, is disposed behind the objective lens system as viewed from the object side, for zooming and refocusing the intermediate image. Also, a distance between the plural lens groups is shortest in zoom setting in the telephoto end position.

12 Claims, 5 Drawing Sheets f = 6.00 f = 10.05 f = 16.59 f = 6.00 f = 10.05 f = 16.59

ZOOM LENS AND IMAGE TAKING APPARATUS

BACKGROUND OF THE INVENTION

1. Field of the Invention

The present invention relates to a zoom lens and image taking apparatus. More particularly, the present invention relates to a zoom lens and image taking apparatus of which a size of the entirety can be small by reduction of a diameter of lens optics.

2. Description Related to the Prior Art

Digital still cameras are widely used, which are a small type with a small thickness, and are portable for carrying. Even in the digital still camera, an optical zoom assembly is incorporated in addition to digital zoom control in which images are zoomed digitally by image processing.

A zoom lens as optical zoom assembly for use in the digital still camera of a small thickness type is constructed so that object light is reflected in a prism or the like to focus an image on a light receiving surface. Also, JP-A 2000-131610 discloses the zoom lens of a path bending type in which a zoom ratio is 3 times or so.

The zoom lens of a reflection type is disposed to bend a path of object light by reflection in a direction vertical to a thickness direction of the digital still camera. Also, an image pickup device such as a CCD is disposed behind the zoom lens and vertically to the thickness direction of the digital still camera. The thickness of the digital still camera of a thin type is determined by a diameter of lenses/lens groups included in the zoom lens and a size of a sensor package of the image pickup device.

Also, U.S. Pat. No. 5,363,163 (corresponding to JP-A 5-005839) discloses a viewfinder optical system for a single lens reflex camera, in which the object light is reflected to bend a path and an image is zoomed. According to this, a zoom relay lens is used for forming an observable image by reducing a size of an intermediate image formed by a taking lens.

In the zoom lens of a known type, the aperture stop control device is disposed in a position away from a first one of the lenses/lens groups located on the object side, namely on a second one of the lenses/lens groups or behind the same. A distance from the aperture stop control device to the first lens/lens group on the object side is considerably great. Specially in the zoom setting in the wide-angle end position, a chief ray height of the first lens/lens group on the object side is very great. Therefore, the first lens/lens group, a prism for reflecting the object light, and other elements must be formed in a relatively large size according to the chief ray height. On the other hand, the size of the first lens/lens group, prism and other elements has not been a factor influencing to reduction of the thickness of the digital still camera, because their size is approximately equal to a size of the sensor package of the image pickup device.

However, a size of the sensor package of the image pickup device has been smaller and smaller in the technical development. A diameter of the lenses/lens groups included in the zoom lens is a bottleneck against the reduction of the thickness of the digital still camera. Reduction of a diameter of the lenses/lens groups included in the zoom lens has been desired strongly.

If it is conceived to use a relay lens of the viewfinder optical system also in an image taking optical system, a general size of the zoom lens is determined according to a size of the intermediate image. There is a problem in that the size of the entirety of the zoom lens must be larger than a sensor package of the image pickup device. A size of the intermediate image may be several times as large as a size of the light receiving surface when the relay lens of the viewfinder optical system is used in the image taking optical system to reduce the intermediate image in the size for refocusing. A diameter of the zoom lens may be larger instead of being smaller.

SUMMARY OF THE INVENTION

In view of the foregoing problems, an object of the present invention is to provide a zoom lens and image taking apparatus of which a size of the entirety can be small by reduction of a diameter of lens optics.

In order to achieve the above and other objects and advantages of this invention, a zoom lens having a variable image magnification includes an objective lens system, having a positive refractive power, including a reflector for reflecting object light being incident toward a light receiving surface, and an aperture stop control device for passing the object light, the objective lens system forming an intermediate image by focusing the object light nearer to an object side than the light receiving surface. A relay lens system has a positive refractive power, and includes plural lens groups, disposed behind the objective lens system as viewed from the object side, for refocusing the intermediate image on the light receiving surface, and for zooming by moving at least one of the plural lens groups on an optical axis.

The image magnification is kept by the relay lens system at 0.9 time or more in an entire zoom range.

The plural lens groups are constituted in an order from the object side by an R1 lens group, having a positive refractive power, and movable on the optical axis. An R2 lens group has a positive refractive power, and is movable on the optical axis. An R3 lens/lens group has a negative refractive power. The R1 and R2 lens groups move on the optical axis with a change in a distance between each other for zooming.

The R3 lens/lens group is movable on the optical axis, and is moved for focusing upon movement of the R1 and R2 lens groups for zooming.

In one preferred embodiment, the R3 lens/lens group remains stationary on the optical axis.

A distance between the R1 and R2 lens groups is the shortest in zoom setting in the telephoto end position.

The objective lens system includes a focusing lens movable on the optical axis.

The aperture stop control device determines an f-number in zoom setting in the telephoto end position. The relay lens system includes a second aperture stop control device for determining the f-number in zoom setting in the wide-angle end position.

The objective lens system includes objective lens optics for passing the object light being incident toward the reflector. Focusing optics focus the object light reflected by the reflector.

The reflector is constituted by a prism.

In another preferred embodiment, the reflector is constituted by a reflection mirror.

Also, an image taking apparatus having a variable image magnification, for introducing object light from an object side toward a light receiving surface on an optical axis, is provided. An objective lens system has a positive refractive power, and includes a reflector for reflecting the object light being incident to guide the object light on the optical axis, and an aperture stop control device for passing the object light, the objective lens system forming an intermediate image by focusing the object light nearer to the object side than the light receiving surface. A relay lens system has a positive refractive power, and includes plural lens groups movable on the optical axis, disposed behind the objective lens system as viewed from the object side, for zooming and refocusing the intermediate image on the light receiving surface.

Consequently, a size of the entirety of the zoom lens can be small by reduction of a diameter of lens optics, owing to the combination of the relay lens system to the objective lens system and the use of the plural lens groups.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
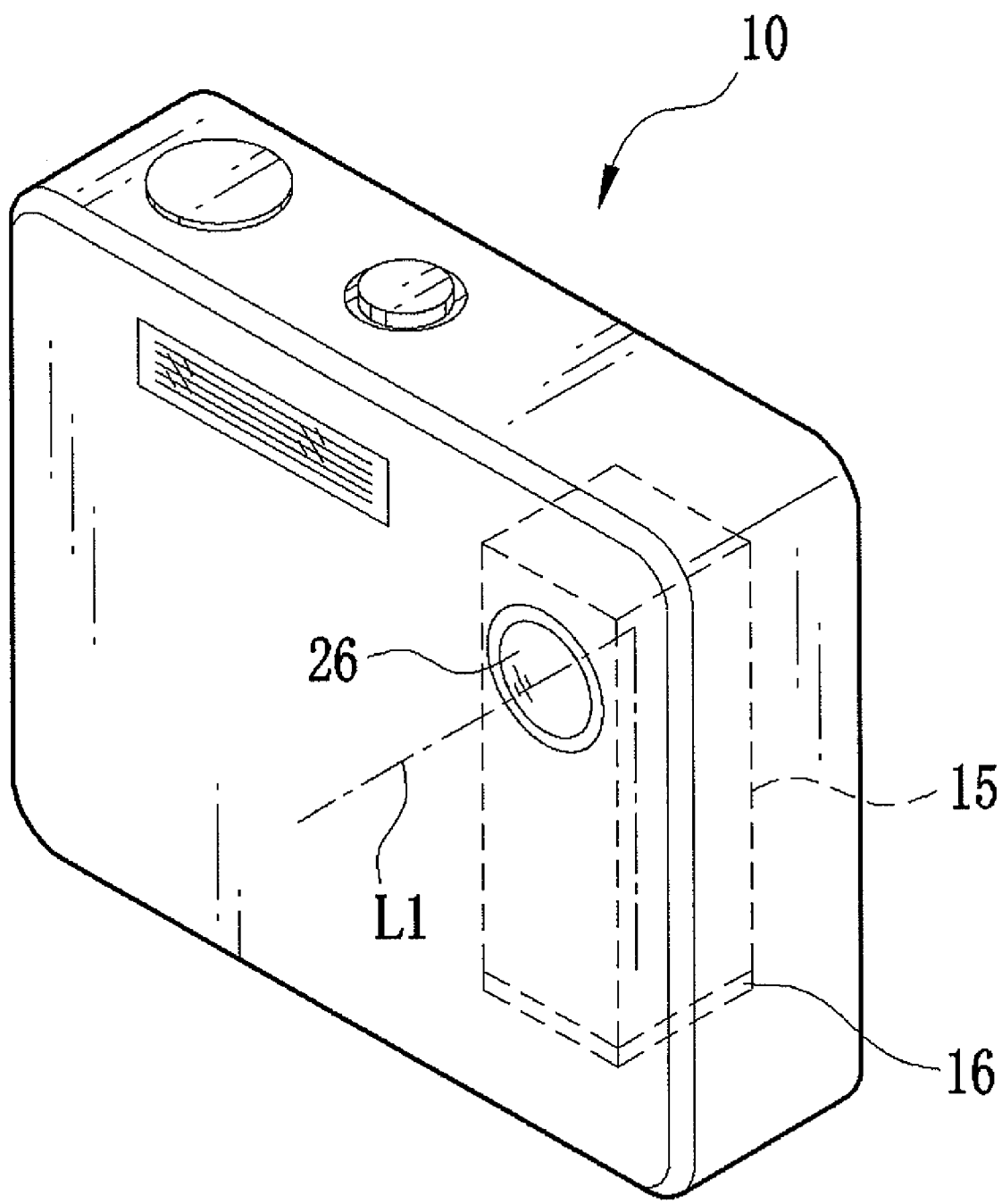
FIG. 1 is a perspective view illustrating a digital still camera.

In FIG. 1, a preferred digital still camera 10 as image taking apparatus is illustrated. There is a zoom lens 15, behind which an image pickup device 16 is disposed. Objective lens optics 26 appear in a front surface of the digital still camera 10, and are one of lenses/lens groups constituting the zoom lens 15 and located on the object side. The zoom lens 15 receives object light incident through the objective lens optics 26, and focuses the light on a light receiving surface. A diameter of the zoom lens 15 is set substantially equal to a size of an outer width of a sensor package of the image pickup device 16.

Figure 2A:
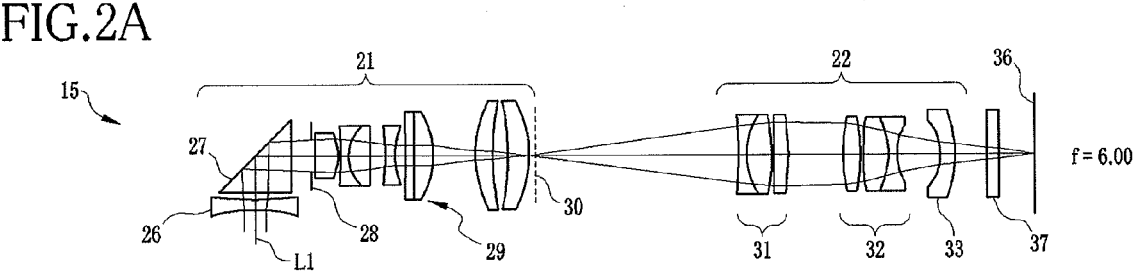
FIG. 2A is a diagram in section illustrating a zoom lens.
Figure 2B:
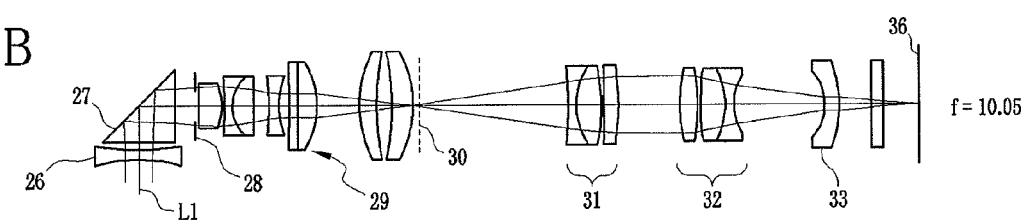
FIG. 2B is a diagram in section illustrating the zoom lens set in an intermediate zoom position.
Figure 2C:
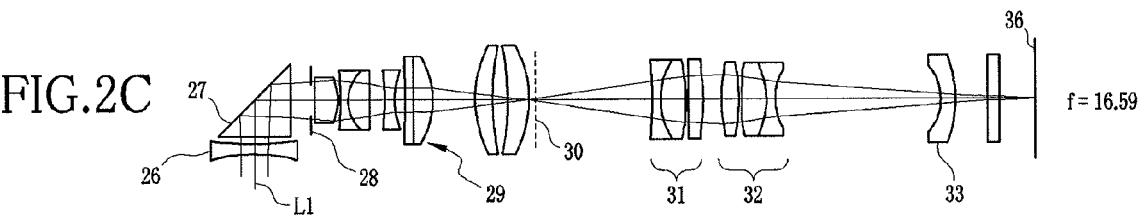
FIG. 2C is a diagram in section illustrating the zoom lens set in a telephoto end position.

In FIGS. 2A, 2B and 2C, the zoom lens 15 includes an objective lens system 21 and a relay lens system 22.

The objective lens system 21 with a positive refractive power has the objective lens optics 26, a prism 27, an aperture stop control device 28 and focusing optics 29 for first focusing. Object light incident through the objective lens optics 26 in front of the digital still camera 10 is reflected by the prism 27 at an angle of 90 degrees, and becomes incident upon the focusing optics 29. The objective lens system 21 has an intermediate focal plane 30 which lies on the object side as viewed from the relay lens system 22. The focusing optics 29 focus the object light from the prism 27 on the intermediate focal plane 30. An intermediate image formed by the objective lens system 21 has a size equal to or smaller than the size of the image pickup device 16. Various lens elements and the prism 27 included in the objective lens system 21 are stationary on their positions, and do not operate for zooming of the zoom lens 15.

The aperture stop control device 28 is disposed between the prism 27 and the focusing optics 29. A distance between the objective lens optics 26 and the aperture stop control device 28 is short. The chief ray height is kept small even in the zoom setting in the wide-angle end position (wide-angle extremity) where the chief ray height of the zoom lens 15 is great relatively.

The relay lens system 22 receives light of the intermediate image formed by the objective lens system 21, and refocuses the image on a light receiving surface 36 of image pickup. The relay lens system 22 includes an R1 lens group 31, an R2 lens group 32 and an R3 lens/lens group 33 in an order from the object side.

The R1 lens group 31 is optics with a positive refractive power, and is movable on the optical axis L1. The R2 lens group 32 next to the R1 lens group 31 is optics with a positive refractive power, and is movable on the optical axis L1. When the R1 and R2 lens groups 31 and 32 move, an image to be refocused on the light receiving surface is zoomed. When the zoom lens 15 is moved to a telephoto end position (telephoto extremity), a distance between the R1 and R2 lens groups 31 and 32 becomes shorter. When the zoom lens 15 is moved to the wide-angle end position, the distance between the R1 and R2 lens groups 31 and 32 becomes longer. For their movement, see FIGS. 2A-2C.

The R2 lens group 32 is moved non-linearly according to the position of the R1 lens group 31 to set a focal plane constantly on the light receiving surface 36 during zooming. In other words, the R2 lens group 32 in movement adjusts magnification according to its distance to the R1 lens group 31, and also adjusts the focus.

The R3 lens/lens group 33 has a negative refractive power, and is disposed behind the R2 lens group 32 in a stationary manner on the optical axis L1. The R3 lens/lens group 33 raises the magnification of an image on the light receiving surface 36. Also, the R3 lens/lens group 33 sets a principal point of the relay lens system 22 of the image side nearer to the object side, so as to reduce a total length of the zoom lens 15. The R3 lens/lens group 33 corrects various aberrations of the zoom lens 15 effectively in the entire zoom range. Especially, the R3 lens/lens group 33 is effective in correcting the curvature of field.

An image magnification of the relay lens system 22 constructed above is set 0.98 time in the zoom setting in the wide-angle end position. A relationship between a size of the light receiving surface of the image pickup device 16 and the size of the entirety containing the sensor package is considered. According to this, the image magnification of the relay lens system 22 is set 0.9 time or more, and preferably 1.0 time or more.

A glass cover 37 is disposed on the image pickup device 16 behind the relay lens system 22. The relay lens system 22 is adjusted to focus an image suitably on the light receiving surface 36 through the glass cover 37.

The zoom lens 15 constructed above has the aperture stop control device 28 in the objective lens system 21 which does not operate for zooming. The objective lens optics 26, disposed the nearest to the object side, are near to the aperture stop control device 28. The chief ray height is small even in the zoom setting in the wide-angle end position. It is possible for the objective lens optics 26 and the prism 27 to have small sizes according to the chief ray height, to reduce the diameter of the zoom lens 15.

As the R2 lens group 32 is movable for both of zooming and focusing, one common actuator can be utilized to move the R1 and R2 lens groups 31 and 32 for zooming and the R2 lens group 32 for focusing. A system for controlling and driving the zoom lens 15 can be constructed simply.

Also, the R1 and R2 lens groups 31 and 32 respectively have a positive refractive power, so that various aberrations of the zoom lens 15 can be corrected easily, because operation of refraction is shared by those for refocusing the intermediate image on the light receiving surface.

As the R3 lens/lens group 33 has a negative refractive power in the relay lens system 22, a principal point of the relay lens system 22 on the image side can be set near to the intermediate focal plane 30, to reduce the entire length of the zoom lens 15. Also, the negative refractive power of the R3 lens/lens group 33 is effective in suitably correcting the curvature of field which might occur seriously upon refocusing an intermediate image.

A distance between the R1 and R2 lens groups 31 and 32 is the shortest in the zoom setting in the telephoto end position, and the longest in the zoom setting in the wide-angle end position. This can decrease the diameter of the lens components near to the intermediate focal plane 30. The diameter of the entirety of the zoom lens 15 can be reduced.

An image magnification of the relay lens system 22 is set 0.9 time or more in the entirety of the zoom range. This can decrease the diameter of the lens components near to the intermediate focal plane 30, so as to reduce the diameter of the entirety of the zoom lens 15.

Figure 3A:
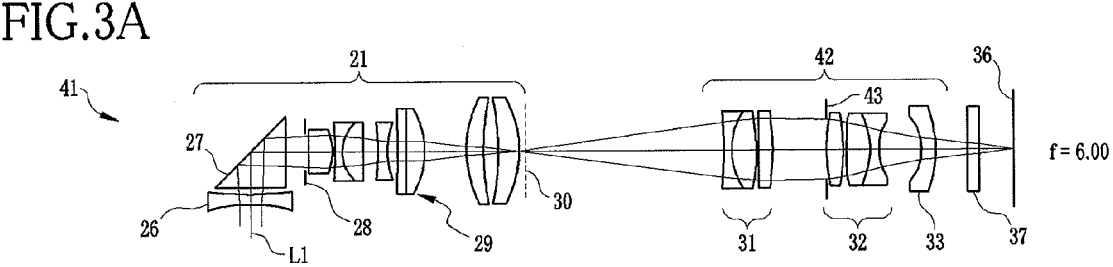
FIG. 3A is a diagram in section illustrating one preferred zoom lens having two aperture stop control devices.
Figure 3B:
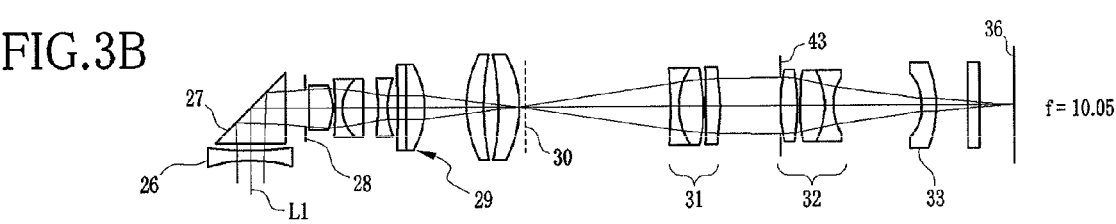
FIGS. 3B and 3C are diagrams in sections illustrating the zoom lens set in an intermediate zoom position and telephoto end position.
Figure 3C:
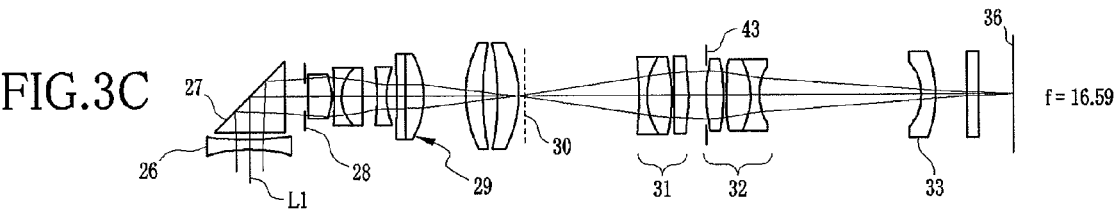

Although the aperture stop control device 28 is associated with the objective lens system 21, an additional aperture stop control device may be associated with the relay lens system 22. In FIGS. 3A-3C, a zoom lens 41 is constituted by a relay lens system 42 and the objective lens system 21 which is the same as that in the zoom lens 15. The aperture stop control device 28 is provided in the objective lens system 21. A second aperture stop control device 43 in the relay lens system 42 is disposed between the R1 and R2 lens groups 31 and 32 as an additional element to the structure of the relay lens system 22. Specifically, the second aperture stop control device 43 is disposed stationarily on the front surface of the R2 lens group 32, and movable together with this at the time of zooming and focusing.

In the zoom lens 41, an aperture size of the second aperture stop control device 43 is adjusted to set an aperture suitably for each value of magnification. In FIG. 3A for the wide-angle end position, the f-number of the entirety of the zoom lens 41 is determined not by the aperture stop control device 28 in the objective lens system 21 but by the second aperture stop control device 43 in the relay lens system 42. In contrast, the f-number of the entirety of the zoom lens 41 is determined by the aperture stop control device 28 in the objective lens system 21 for an intermediate zoom position of FIG. 3B and for a telephoto end position of FIG. 3C.

It is possible to set small a ratio between f-numbers in the zoom setting in the wide-angle and telephoto end positions by disposing the second aperture stop control device 43 in the relay lens system 42. In a range from the wide-angle end position to the telephoto end position, should the f-number be determined by the aperture stop control device 28 in the objective lens system 21, the f-number will increase in proportion to the focal length so as to determine too low a lens speed in the zoom lens in the telephoto end position. However, such a problem can be prevented in the present invention. Furthermore, should the f-number be set small in the zoom setting in the telephoto end position by the aperture stop control device 28 of the objective lens system 21 to determine a high lens speed in the zoom lens, the f-number in the zoom setting in the wide-angle end position is too small, and raises difficulty in correcting various aberrations. The total reflection condition of the prism 27 will be very difficult to satisfy for all of the rays. However, such a problem can be prevented in the present invention.

In the first embodiment above, the R3 lens/lens group 33 in the relay lens system 22 or 42 is stationary on the optical axis L1. In contrast, a second preferred embodiment is provided, in which the R3 lens/lens group 33 is movable on the optical axis. Elements similar to those of the above embodiment are designated with identical reference numerals.

Figure 4A:
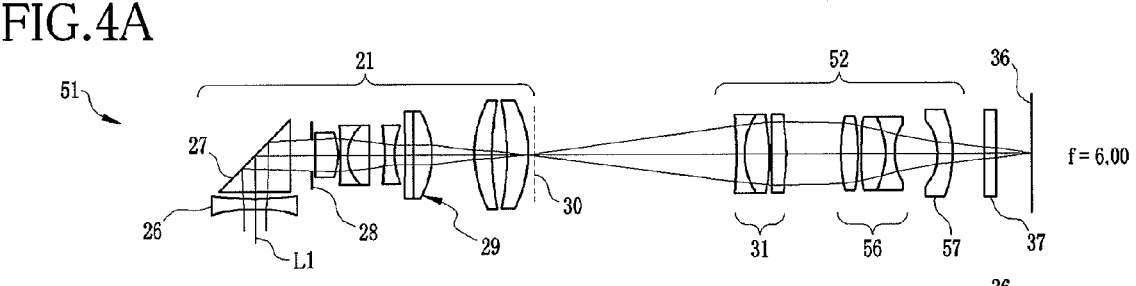
FIG. 4A is a diagram in section illustrating another preferred zoom lens of which an R3 lens/lens group is movable.
Figure 4B:
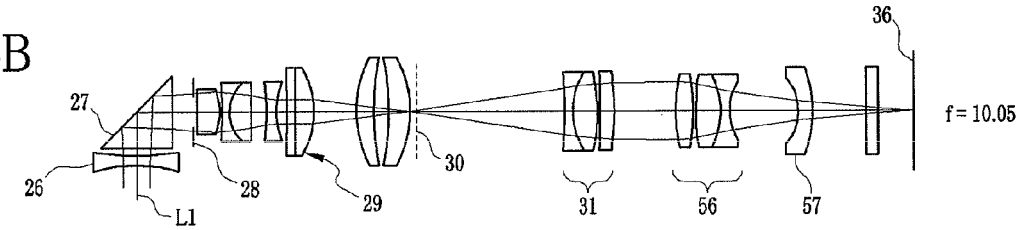
FIGS. 4B and 4C are diagrams in sections illustrating the zoom lens set in an intermediate zoom position and telephoto end position.
Figure 4C:
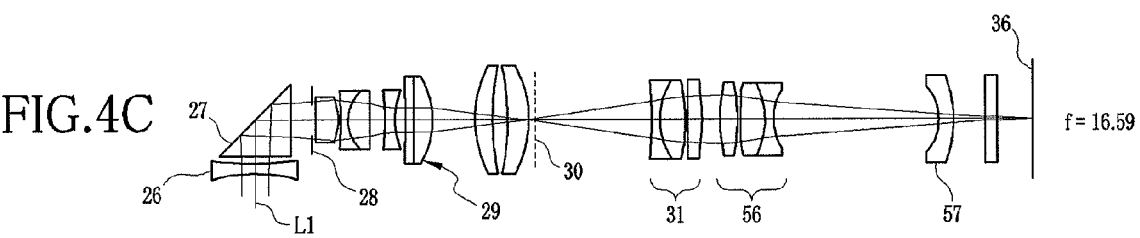

In FIGS. 4A, 4B and 4C, a zoom lens 51 includes the objective lens system 21 and a relay lens system 52. The relay lens system 52 includes the R1 lens group 31, an R2 lens group 56 and an R3 lens/lens group 57. The R2 lens group 56 is structurally similar to the R2 lens group 32 but is controllable differently. The R3 lens/lens group 57 is similar to the R3 lens/lens group 33 but is movable on the optical axis L1.

The R2 lens group 56 in the relay lens system 52 is moved by movement of the R1 lens group 31 for zooming. A moving amount of the R2 lens group 56 is proportional to that of the R1 lens group 31. A distance between those is the shortest in the zoom setting in the telephoto end position, and the longest in the zoom setting in the wide-angle end position. See FIGS. 4A-4C.

The R3 lens/lens group 57 is moved upon zooming of the zoom lens 51, namely upon movement of the R1 and R2 lens groups 31 and 56. The R3 lens/lens group 57 is moved non-linearly according to the position of the R1 lens group 31 to set a focal plane positioned on the light receiving surface during zooming, and adjust the focus according to movement of the R1 and R2 lens groups 31 and 56.

An image magnification of the relay lens system 52 in the zoom setting in the wide-angle end position is 1.05 times. The image magnification of the relay lens system 52 in the entire zoom range is 0.9 time or more.

The R1 and R2 lens groups 31 and 56 are moved for zooming while a proportional relationship is kept between moving amounts. The R3 lens/lens group 57 is moved non-linearly with movement of the R1 lens group 31 for focusing. Thus, the degree of freedom in correcting various aberrations can be high. The aberrations can be corrected in the entire zoom range.

The movement of the R2 lens group 56 is straight and proportional to that of the R1 lens group 31. So an actuator for moving the R1 and R2 lens groups 31 and 56 can be used commonly for moving the R3 lens/lens group 57. The relay lens system 52 can be controlled by a simple structure without need of an actuator specialized for the R3 lens/lens group 57.

Figure 5:
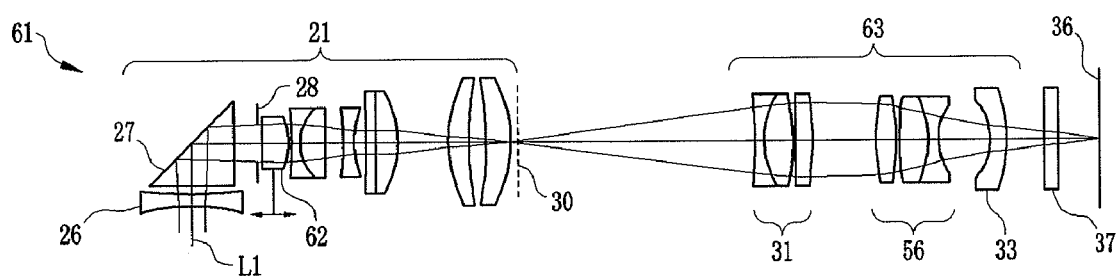
FIG. 5 is a diagram in section illustrating one preferred zoom lens having a focusing lens within an objective lens system.

The focus is adjusted in the first embodiment by the R2 lens group 32 and in the second embodiment by the R3 lens/lens group 57. However, a lens component included in the objective lens system 21 may be moved for focusing. In FIG. 5, one preferred zoom lens 61 includes a focusing lens 62, which is one of elements in the focusing optics 29 having a small diameter and a light weight, and is movable on the optical axis L1 for focusing. A relay lens system 63 includes the R1 lens group 31, the R2 lens group 56 and the R3 lens/lens group 33. Moving amounts of the R1 and R2 lens groups 31 and 56 are proportional to each other. A distance between the R1 and R2 lens groups 31 and 56 is short in the zoom setting in the telephoto end position, and long in the zoom setting in the wide-angle end position.

The focus is adjusted by the focusing lens 62 with the small weight in the objective lens system 21. Focusing is possible in the zooming because only small force is required. As the distance between the focusing lens and an object is unchanged during the zooming, a shift of the focusing lens relative to the object distance is common in the entire range of the focal length.

Figure 6:
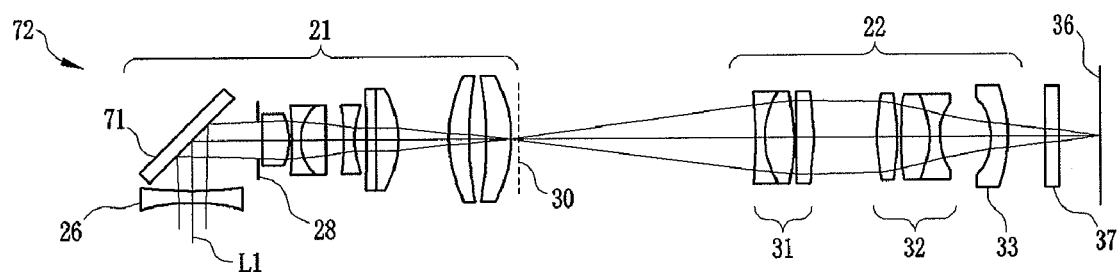
FIG. 6 is a diagram in section illustrating still another preferred zoom lens in which a reflection mirror reflects object light.

Although the prism 27 is used in the above embodiments, object light from the objective lens optics 26 may be reflected by other structures toward the image pickup device 16. For example, a reflection mirror 71 of FIG. 6 may be used in place of the prism 27.

As the reflection mirror 71 is used in place of a prism, a path length of object light will be greater than that in use of the prism. A diameter of objective lens optics disposed nearer to the object side than the reflection mirror 71 must be set greater. However, the reflection mirror 71, which reflects object light in a zoom lens 72, can be used even with an economized small size of the objective lens system 21 because of the short distance between the aperture stop control device 28 and the objective lens optics 26.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A zoom lens having a variable image magnification, comprising:
    an objective lens system, having a positive refractive power, including a reflector for reflecting object light being incident toward a light receiving surface, and an aperture stop control device for passing said object light, said objective lens system forming an intermediate image by focusing said object light nearer to an object side than said light receiving surface;
    a relay lens system, having a positive refractive power, including plural lens groups, disposed behind said objective lens system as viewed from said object side, for refocusing said intermediate image on said light receiving surface, and for zooming by moving at least one of said plural lens groups on an optical axis.

2. A zoom lens as defined in claim 1, wherein said image magnification is kept at 0.9 time or more in an entire zoom range.

3. A zoom lens as defined in claim 1, wherein said plural lens groups are constituted in an order from said object side by:
    an R1 lens group, having a positive refractive power, and movable on said optical axis;
    an R2 lens group, having a positive refractive power, and movable on said optical axis;
    an R3 lens/lens group having a negative refractive power;
    said R1 and R2 lens groups move on said optical axis with a change in a distance between each other for zooming.

4. A zoom lens as defined in claim 3, wherein said R3 lens/lens group is movable on said optical axis, and is moved for focusing upon movement of said R1 and R2 lens groups for zooming.

5. A zoom lens as defined in claim 3, wherein said R3 lens/lens group remains stationary.

6. A zoom lens as defined in claim 3, wherein a distance between said R1 and R2 lens groups is the shortest in zoom setting in the telephoto end position.

7. A zoom lens as defined in claim 1, wherein said objective lens system includes a focusing lens movable on said optical axis.

8. A zoom lens as defined in claim 1, wherein said aperture stop control device determines an f-number in zoom setting in the telephoto end position;
    said relay lens system includes a second aperture stop control device for determining said f-number in zoom setting in the wide-angle end position.

9. A zoom lens as defined in claim 1, wherein said objective lens system includes:
    objective lens optics for passing said object light being incident toward said reflector; and
    focusing optics for focusing said object light reflected by said reflector.

10. A zoom lens as defined in claim 9, wherein said reflector is constituted by a prism.

11. A zoom lens as defined in claim 9, wherein said reflector is constituted by a reflection mirror.

12. An image taking apparatus having an image pickup device for converting an image into an electric signal, comprising:
    an objective lens system, having a positive refractive power, including a reflector for reflecting object light being incident toward said image pickup device, and an aperture stop control device for passing said object light, said objective lens system forming an intermediate image by focusing said object light nearer to an object side than said image pickup device;
    a relay lens system, having a positive refractive power, including plural lens groups, disposed behind said objective lens system as viewed from said object side, for refocusing said intermediate image on said image pickup device, and for zooming by moving at least one of said plural lens groups on an optical axis.

* * * * *